United States Patent [19]

Dietrich

[11] Patent Number: 5,338,901
[45] Date of Patent: Aug. 16, 1994

[54] CONVEYOR BELT WEIGHER INCORPORATING TWO END LOCATED PARALLEL-BEAM LOAD CELLS

[75] Inventor: Ron Dietrich, Lenzburg, Ill.

[73] Assignee: Kaskaskia Valley Scale Company, Lenzburg, Ill.

[21] Appl. No.: 901,678

[22] Filed: Jun. 22, 1992

[51] Int. Cl.$^5$ .................. G01G 11/14; G01G 13/02; G01G 23/02; G01G 19/00
[52] U.S. Cl. ..................... 177/16; 177/119; 177/152; 177/199; 177/211
[58] Field of Search .............. 177/16, 119, 151, 152, 177/199, 211, 255

[56] References Cited

U.S. PATENT DOCUMENTS

| | | | |
|---|---|---|---|
| 3,439,761 | 4/1969 | Laimins | 177/16 |
| 3,650,340 | 3/1972 | Bradley | 177/136 |
| 4,134,465 | 1/1979 | Takahama et al. | 177/16 |
| 4,157,661 | 6/1979 | Schindel | 73/228 |
| 4,260,034 | 4/1981 | Randolph, Jr. et al. | 177/211 |
| 4,627,507 | 12/1986 | Powell et al. | 177/255 |
| 4,682,664 | 7/1987 | Kemp | 177/16 |
| 5,111,896 | 5/1992 | Porcari et al. | 177/16 |

OTHER PUBLICATIONS

"Belt Conveyor Scale Handbook" Ramsey Technology, Inc., Oct. 1990.
"Guide to Simplified Process Measurement" Milltronics, Feb. 1991.
"Instrumentation and Automation for the Process Industries" Ramsey Technology, Inc., Mar. 1991.
"Compuscale II and Belt Scales" Milltronics, Dec. 1985.
"Single Idler Belt Scale" Milltronics, Sep. 1989.

Primary Examiner—Benjamin R. Fuller
Assistant Examiner—Randy W. Gibson
Attorney, Agent, or Firm—Paul M. Denk

[57] ABSTRACT

A conveyor belt scale of the weighbridge type is disclosed having a frame mountable above a run of conveyor belt idler, the weighbridge having a pair of weight transfer bars extending from each end of the device to support the entire weight of the weighbridge and conveyor belt, each of the weight transfer bars being cooperatively connected to a load cell apparatus, each pair of load cells at an end of the device is cooperatively connected by a strain gauge disposed to measure deflections of the load cells under the weight and tortional movement of material passing along the conveyor. The apparatus further contains a speed sensor device to measure the speed at which material moves along the conveyor and a programmable computerized integrator apparatus which accepts the information from the strain gauges and from the speed sensor to give a digital readout of an estimated weight and volume of material passing along the weighbridge at any given time.

5 Claims, 3 Drawing Sheets

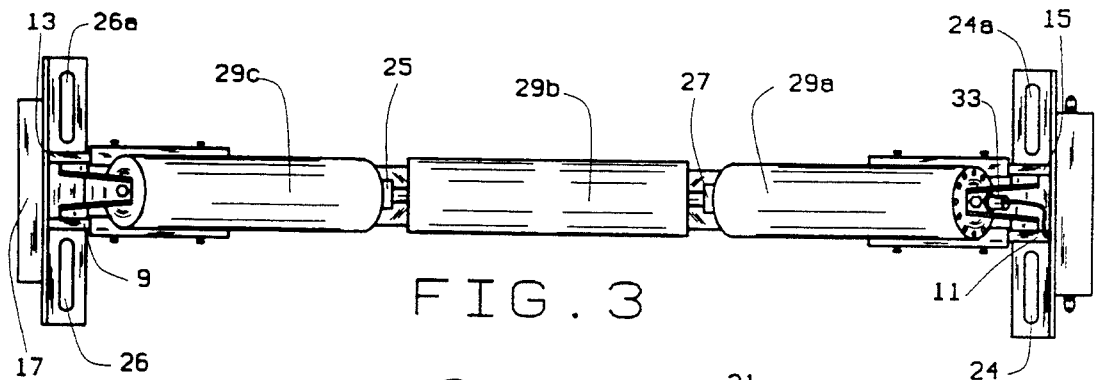
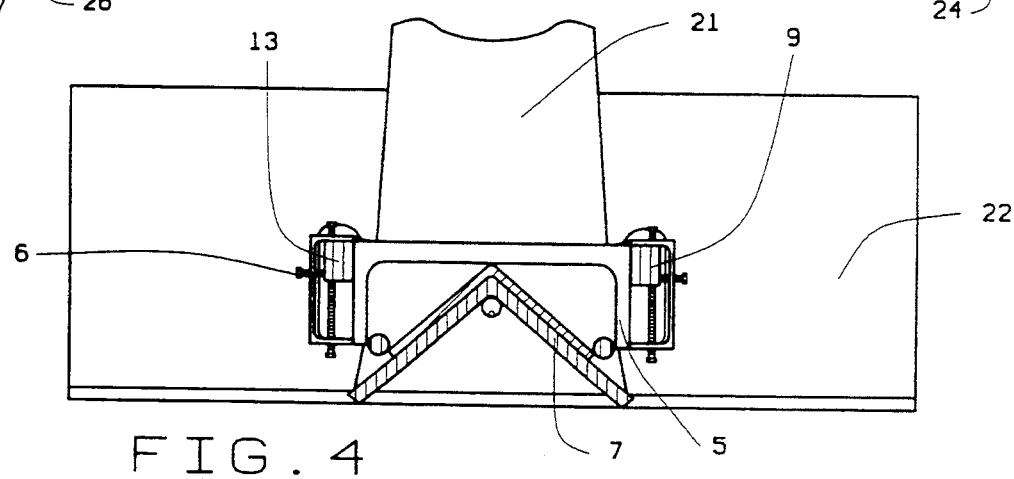
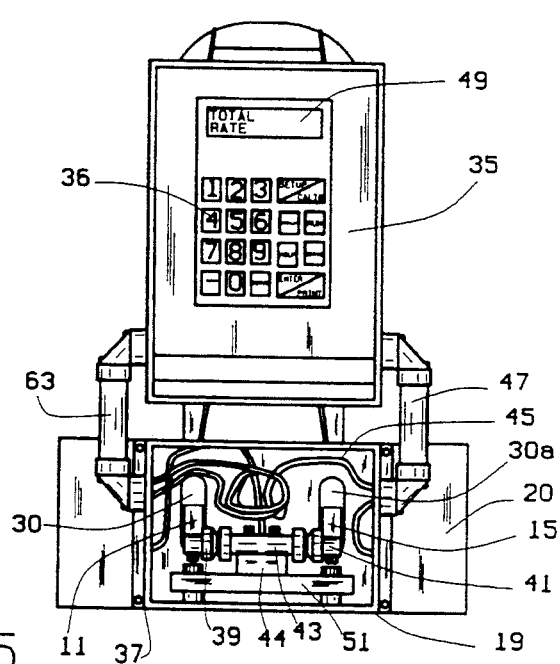

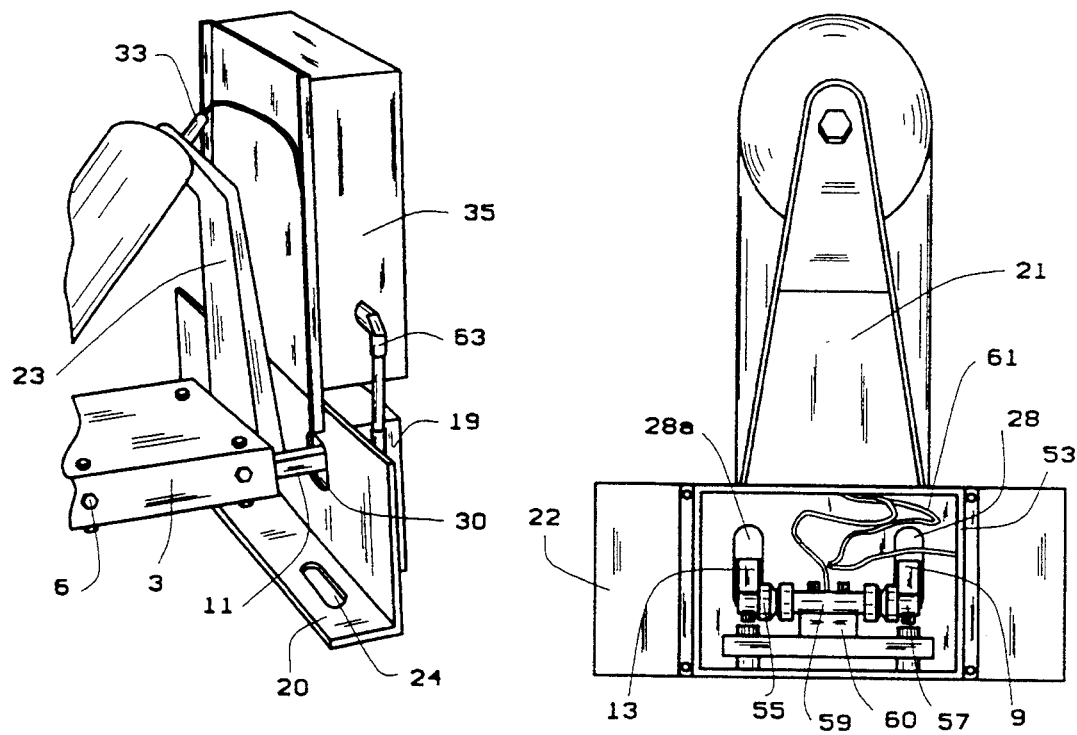
FIG. 6
FIG. 7
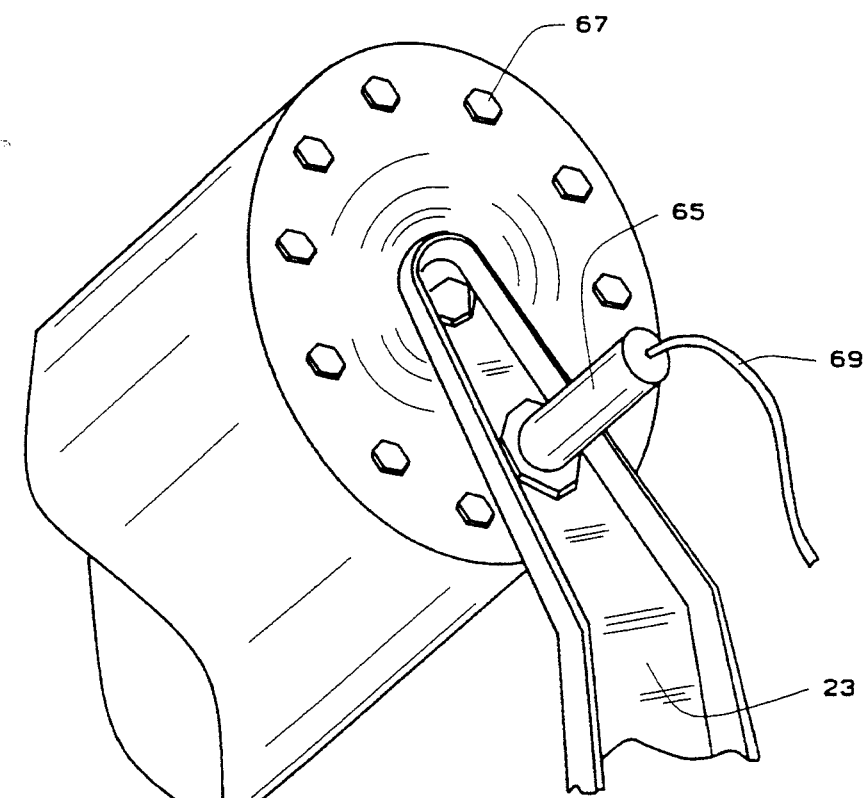
FIG. 8

CONVEYOR BELT WEIGHER INCORPORATING TWO END LOCATED PARALLEL-BEAM LOAD CELLS

BACKGROUND OF THE INVENTION

This invention relates generally to weighing devices, more particularly, to conveyor belt scales of the weighbridge type, used for weighing material transported along a conveyor belt.

Conveyor belt scales are used for continuous weighing of bulk materials transported along the conveyor belt. Examples of such materials are coal, aggregate, slag, or wood chips among others.

In general, conveyor belt scales employ rollers or idlers that are inserted into the conveyor system, either in place of an existing idler assembly or in addition to the existing idlers. The conveyor belt rests on the idlers and the material, like coal for example, passes over the idler assembly causing a downward deflection of the system. Generally, the idler assembly is cooperatively connected to a weight sensor. The weight sensor, depending upon the construction of the particular weighing device, converts the downward deflection into a weight measurement. Ideally, a weighing device would combine the weight with a determination of the speed of the moving conveyor belt to yield a rate of flow of material as well as the total weight of the passing material.

A typical weighing device of this type is disclosed in U.S. Pat. No. 4,682,664 to Kemp. However, this invention has several disadvantages. For example, this design mounts between conveyor frame members and is therefore limited in placement. Installation is more difficult and time consuming. Also, this type of device employs two (2) load cells designed for platform weighting. The load cells are mounted under a modified idler and receive the load force at a single point. The Force generated by the radial movement of this idler (tortional force) is transmitted to the load cell is seen as a weight the same as the weight of the material being weight. For example, a portion of the tortional movement of the idler is sensed as a downward motion on the weighing apparatus and the tortional movement therefore interferes or adds to the actual weight of the passing material and can give inaccurate weight determinations.

OBJECT OF THE INVENTION

It is, therefore, a primary object of the invention to provide a weighbridge device that incorporates one (1) load cell designed for a conveyor weighbridge with dual strain gauges on one end of the device and one (1) load cell with dual strain gauges on the opposite end of the device so as to get an accurate total measurement of the weight of the passing material across the weighbridge, unlike the prior art which must extrpolate from a single measurement of weight.

Still another object of the invention is to provide a weighbridge device that can determine tortional movement as a positive force on the downstream side and a negative force on the upstream side of the conveyor travel and cancel them out of the weight determination when they are summed.

Yet another object of the present invention is to provide a weighbridge device that can measure the speed of movement of the material across the device so as to compare the speed with the weight of the material and give a measurement of the rate of flow of the material.

A further object of the present invention is to provide a weighbridge device that incorporates a programmable computer than can integrate the weight of material and speed of material passing over the weighbridge and convert that information into a digital readout of accurate weight and volume of material passing over the weighbridge.

Another object of the present invention is to provide a weighbridge device that mounts above the conveyor frame so that the device can be easily and conveniently mounted.

Another object of the invention is to provide a weighbridge device that is easy to assembly, durable, accurate, and well suited for the purpose intended.

Briefly stated, a conveyor belt weighbridge having idlers to support a conveyor belt frame on which the roller idlers are mounted, the weighbridge is capable of being mounted above the conveyor belt system and has two pairs of load cells connected perpendicular to each end of the frame, strain gauges disposed to receive deflections from each pair of load cells as the material passes across the weighbridge; a speed detector to determine the speed of the material passing over on the conveyor, and a programmable computer for converting the information supplied by the strain gauges, and speed detector and converting that information to the desired weight and volume data.

BRIEF DESCRIPTION OF THE DRAWINGS

FIG. 3 is a top plan view of the weighbridge of the present invention;

FIG. 4 is a cross-sectional view of. the load cell brackets taken across lines 4—4 of FIG. 2;

FIG. 5 is an end view of the weighbridge apparatus of the previous drawing demonstrating the load cell, with dual strain gauges, and computer integrator assembly;

FIG. 6 is a partial end-view of the approximate opposite side of that of FIG. 5 demonstrating the load cell housing and assembly therein;

FIG. 7 is a front view of the load cell housing at the opposite end of the weighbridge device, opened and disposing the load cell and double strain gauge assembly; and FIG. 8 is an enlarged view of the speed sensor assembly of the weighbridge of the present invention.

DESCRIPTION OF THE PREFERRED EMBODIMENT

Figure 1:
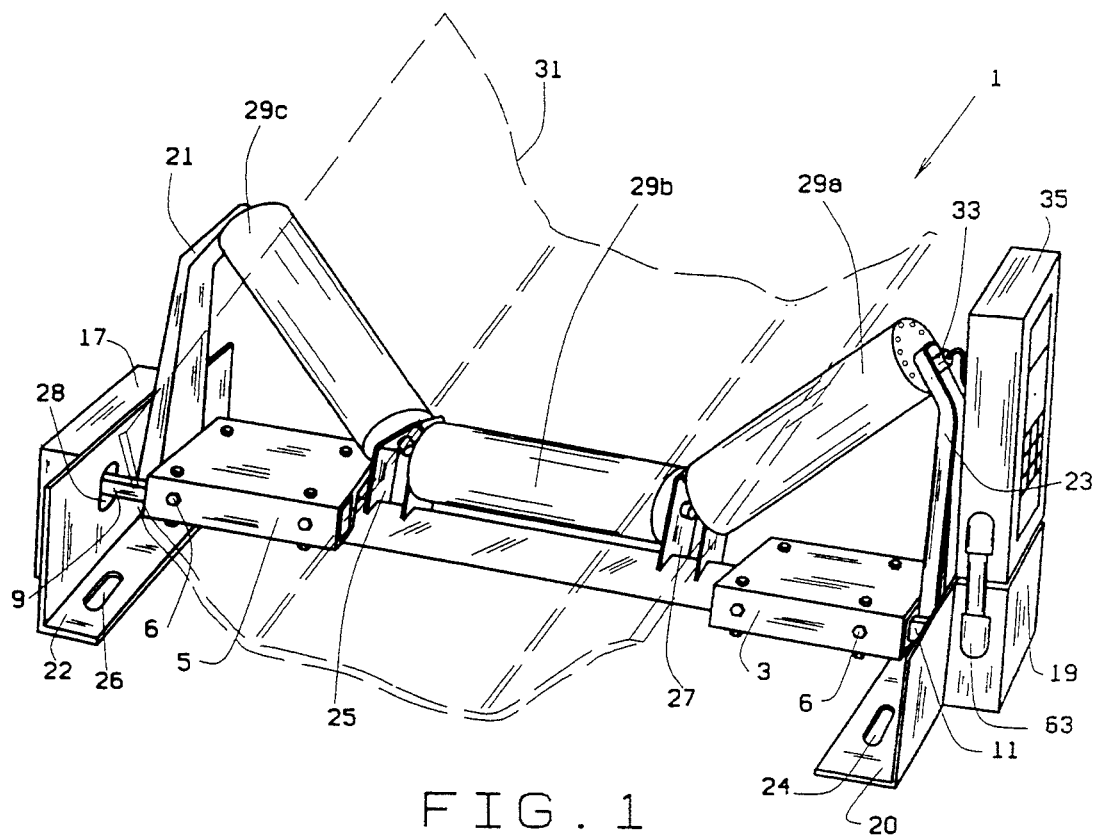
FIG. 1 is a perspective view of the weighbridge apparatus of the present invention with the conveyor belt shown in phantom.

FIG. 1 illustrates the weighbridge belt scale of the present invention shown generally at 1. Weighbridge 1 contains a pair of idler harnesses 3 and 5 designed to mount on an existing idler strut 7 with a plurality of idler adjustment screws shown generally at 6. Idler adjustments screws 6 are used to align the system on strut 7 to optimally use the device. Weighbridge 1 further contains two pairs of weight transfer bars 9, 11, and 13 15, (FIG. 7) cooperatively connected with weight sensor assemblies housed generally at 17 and 19 as will be discusses in detail herein-after.

Sensor assemblies 17 and 19 are ridgidly affixed to mounting brackets 20 and 22 which contain mounting slots 24, 24a and 26, 26a or other appropriate means for securing the belt scale to the existing run of idler in a conveyor belt assembly. Under this configuration, weight transfer bars 9, 11 and 13, 15 extend through holes 28, 28a and 30, 30a (see FIG. 6) in brackets 22 and 20 respectively so that the weight transfer bars and the weigh sensor assembly bear all of the weight of material traveling across a conveyor belt. FIG. 6 illustrates how the idler harnesses and weight transfer bars extend through opening 30 of bracket 20 to suspend and support the weighbridge device; this configuration is the same for weight support 15. Also, harness 5 with weight transfer arm 9 and 13 extend through bracket 22 with the same arrangement and purpose at the opposite end of the weighbridge.

Weighbridge 1 has a pair of idler roller supports 21 and 23 and roller brackets 25 and 27 disposed to support a series of idler rollers 29a, 29b, 29c. The rollers can vary in size and angle of support so as to appropriately support a run of conveyor belt passing over the rollers as shown in phantom as 31 in FIG. 1. A speed sensor device, shown generally at 33, is disposed to determine the speed of rotation of an idler roller, as at 29a so as to determine the rate at which conveyor belt 31 moves along the belt scale.

The weight sensor assemblies, shown generally at 17 and 19 and the speed sensor device 33 are electronically connected to a integrator unit 35 which is a computer that is programmed to integrate the reference data it receives from weight sensor assemblies and the speed sensor. Integrator 35 can display the desired weight and volume of material passing over the belt scale at any given time.

Figure 2:
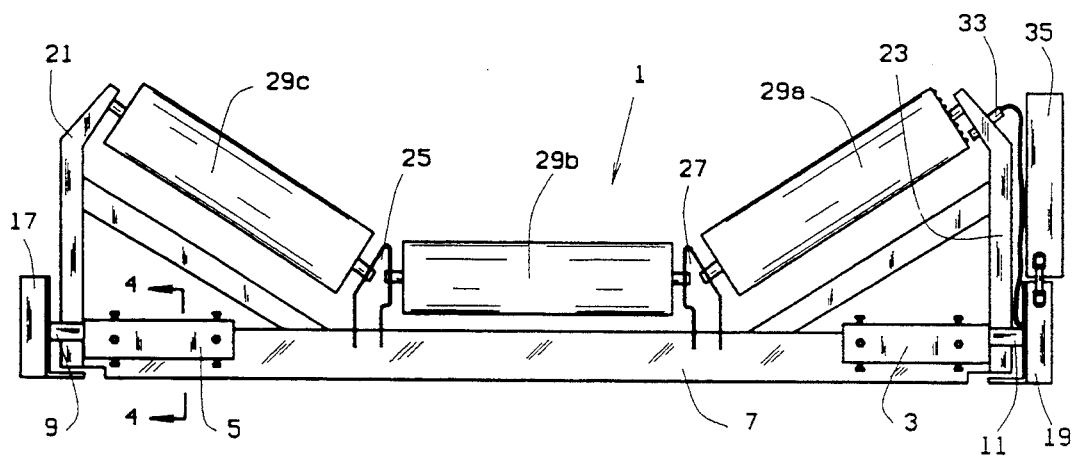
FIG. 2 is a front elevational view of the weighbridge of the present invention.

FIGS. 2 and 3 further illustrate the relationship of the component parts of weighbridge 1. Turning now the weight sensing assemblies of the apparatus, weight sensor assembly 19 is shown in greater detail at FIG. 5. Assembly 19, with housing 37, is affixed to bracket 20. FIG. 5 shows housing 37 with the front panel removed so as to expose the interior components of that assembly. Weight transfer bars 11 and 15 protrude through openings 30 and 30a respectively of bracket 20. Weight transfer bar 11 rests on a load cell 39 and weight transfer bar 15 rests on load cell 41, the load cells being perpendicular to the idler and to the weight transfer bars. Strain gauge 43 is affixed between the two load cells and rests on mounting block 44. The load cells are transducers that convert the load transmitted by the weight transfer bars into analog electric signals. This conversion is achieved by the physical deformation of strain gauge 43 which is mounted to the load cell and wired into a wheat stone bridge configuration. When a force component is applied to a load cell by compression or tortional movement, a deflection of the load cell introduces strain to-strain gauge 43. Strain produces an electrical resistance change proportional to the load. This change in electrical resistance is transmitted through wires 45 which are housed in conduit 47 to computerized integrator 35 and the data is integrated and displayed as a digital readout at display 49 on the face of integrator 35. Furthermore, an overload protection bar 51 prevents excess deflection of the load cells and prevents damage to the load cells and the strain gauge unit.

A corresponding weight sensor assembly 17 within housing 53 (shown with the front panel removed) is mounted at the opposite end of the weighbridge from weight sensor assembly 19 and is illustrated at FIG. 7. Weight transfer bars 9 and 13 extend through openings 28 and 28a respectively of bracket 22 with weight transfer bars 13 and 15 resting on load cells 55 and 57 respectively, the load cells being perpendicular to the idler and weight transfer bars. Strain gauge 59 is affixed between load cells 55 and 57 resting upon mounting block 60 and has the same working relationship with load cells 55 and 57 as does strain gauge 43 in weight sensor assembly 19 as previously described. Electric impulses are transmitted to integrator 35 through wire 61. Wire 61 enters integrator 35 through conduit 63 (FIG. 5). Electric impulses from assembly 17 are integrated with the electric impulses from the sensor unit 19 to yield a reading of weight.

This two load cell, four strain gauge arrangement allows for integration of the tortional component of force on the weighbridge unit. Actually, each of the load cells 39 and 41 is an integral cell, forming a single unit, which has the weight of the conveyor applied to it, at its ends, as by means of the weight transfer bars, as for example, 11 and 15, at one end of the idler. Then, within the strain gauge 43 are actually two strain gauges, for providing a detection and measurement of the torsional forces generated therein, as at the upstream and downstream side of the idler, upon which the conveyor belt moves. The compound strain gauge 43 is then supported upon the mounting block 44, as noted. The same type of structural arrangement with respect to the load cells and strain gauges is provided at the opposite end 17 of the idler. Two strain gauges are located on the downstream side of the weighbridge and two strain gauges are situated on the upstream side of the weighbridge. As the conveyor belt bearing material moves across the weighbridge, the deflections measuring tortional force on the downstream side in subtracted from the tortional force on the upstream side by the positive and negative force thereby eliminating the tortional force from the equation yielding total weight crossing the weighbridge unit. Furthermore, having a weight sensor assembly on each end of the weighbridge providing information to the integrator, allows for a more accurage weighing of material passing over the weighbridge when the passing material is not spread evenly across, the width of the conveyor belt.

Turning now to the speed sensing device 33, one embodiment is best illustrated in FIG. 8. A proximation sensor unit 65 is mounted on brace 23 with any acceptable mounting means. Idler roller 29 has a plurality of exposes screws or rivets 67 attached to the outside end. The screws 67 are placed at a predetermined space so as to represent a predetermined distance. As the idler roller 28 turns, the screws move along an endless pathway and proximation sensor unit 65 detects the screws and takes a reading as the speed of rotation of idler roller 29A. That speed reading is transmitted through wire 69 to integrator 35 wherein the computer program integrates the speed of rotation of idler 29 with the weight readings of sensor unit 17 and 19 so as to give digital readout of the volume of material passing over the conveyor in a given amount time.

Numerous variation in the speed sensor of the present invention will occur to those skilled in the art and do not depart from the scope of this invention. For example, the screws could be placed about the external face of an idler roller rather than on the end of an idler roller and the proximation sensor unit could be placed so as to read the turning in that manner. Alternatively, the speed sensor could be mounted directly to the shaft of an idler roller and eliminate the need for a proximation sensor device. However, the configuration or design of the speed sensor itself is not essential to the spirit of this invention.

In view of the above, it will be seen that the various objects and features are achieved and other advantageous results are obtained. As various changes could be made in the above construction without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A conveyor belt weighbridge unit measuring weight and volume of bulk material passing along a conveyor belt during movement of the belt, said weighbridge unit provided for eliminating torsional distortions to the measured weight during weight analysis by the said unit, comprising:

support means for supporting said conveyor belt, said support means arranged transversely to the conveyor belt, said support means having a first end and a second end, a first pair of load cells and a second pair of load cells, said first pair of load cells cooperatively connected to said first end of the support means by a first pair of weight transfer bars, said second pair of load cells being cooperatively connected to said second end opposite said first end of said support means by a second pair of weight transfer bars, at least two strain gauges, said strain gauges being operatively connected to the first pair and said second second pair of load cells, said strain gauges disposed for measuring deflections in the load cells caused by vertical and torsional force components during movement of said bulk material on said conveyor belt, frame members for the conveyor belt arranged laterally relative to the conveyor belt which supports the load cells along a line of travel of said conveyor belt, one of each pair of transfer bars extending from each said end of the support means, one of each of said pair of weight transfer bars resting upon one of said load cells wherein a four point support for the support means is provided to furnish measurement of the deflections caused in said load cells by the vertical and torsional forces generated through movement of the material ladened on said conveyor belt said said first pair and said second pair of weight transfer bars at each said end of the support means providing the sole support for the support means and the conveyor belt, said support means being supported by said load cells vertically above the conveyor belt frame members, a speed sensor cooperatively connected to said support means, said speed sensor disposed to measure a speed of travel of said conveyor belt over said weighbridge unit, and a computerized integrator means, said integrator means disposed to integrate vertical and torsional force components of movement of said conveyor to balance out and eliminate effects of the torsional force component generated by the movement of said conveyor and convert the vertical force components and said speed of the conveyor into the weight of the material passing on said conveyor belt and for further calculation into a volume of said material being conveyed on said conveyor.

2. The invention of claim 1 wherein the integrator means is programmable.

3. The invention of claim 2 wherein the integrator means produces a digital read-out signal.

4. The invention of claim 1 further comprising adjustable screw means for proper aligning the apparatus within a run of said conveyor.

5. The invention of claim 1 further comprising means for protecting said load cells from overload.

* * * * *

UNITED STATES PATENT AND TRADEMARK OFFICE
CERTIFICATE OF CORRECTION

PATENT NO. : 5,338,901
DATED : August 16, 1994
INVENTOR(S) : Ron Dietrich

It is certified that error appears in the above-indentified patent and that said Letters Patent is hereby corrected as shown below:

```
    Column 6, line 1, after "each", insert

---of said---; line 9, remove "said", second occurrence.
```

Signed and Sealed this

Fifteenth Day of November, 1994

Attest:

BRUCE LEHMAN

*Attesting Officer*    *Commissioner of Patents and Trademarks*